United States Patent
Acharya et al.

(10) Patent No.: US 7,455,132 B2
(45) Date of Patent: Nov. 25, 2008

(54) HYDRAULIC AXLE COMBINATION

(75) Inventors: Barun Acharya, Johnson City, TN (US); Xingen Dong, Greeneville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 174 days.

(21) Appl. No.: 11/409,604

(22) Filed: Apr. 24, 2006

(65) Prior Publication Data

US 2007/0029118 A1 Feb. 8, 2007

Related U.S. Application Data

(60) Provisional application No. 60/676,384, filed on Apr. 29, 2005.

(51) Int. Cl.
*B60K 17/28* (2006.01)
(52) U.S. Cl. .................... 180/53.4; 180/6.48
(58) Field of Classification Search ............... 180/65.1, 180/53.4, 6.48, 308, 252, 65.3, 65.6, 65.8, 180/65.7; 417/231, 205, 199.1, 206, 261, 417/238; 74/424, 665 M, 624
See application file for complete search history.

(56) References Cited

U.S. PATENT DOCUMENTS

| | | | |
|---|---|---|---|
| 2,192,442 A | 3/1940 | Hoffman | |
| 2,608,054 A | 8/1952 | Price | |
| 2,780,424 A | 2/1957 | Price | |
| 2,996,135 A | 8/1961 | Grabow | |
| 3,053,324 A | 9/1962 | Morley | |
| 3,238,714 A | 3/1966 | Schur | |
| 3,315,085 A | 4/1967 | Milete et al. | |
| 4,031,405 A | 6/1977 | Asperger | |
| 4,280,579 A | 7/1981 | Zaunberger et al. | |
| 4,359,868 A | 11/1982 | Slonim | |
| 4,522,025 A | 6/1985 | Greune et al. | |
| 5,040,429 A * | 8/1991 | Del Castillo | 74/424 |
| 5,078,222 A * | 1/1992 | Hauser et al. | 180/6.48 |
| 5,622,051 A * | 4/1997 | Iida et al. | 60/456 |
| 5,800,134 A * | 9/1998 | Hasegawa et al. | 417/269 |
| 6,182,784 B1 | 2/2001 | Pestotnik | |
| 6,361,282 B1 * | 3/2002 | Wanschura | 417/206 |

(Continued)

FOREIGN PATENT DOCUMENTS

DE 42 28 498 A1 3/1994

*Primary Examiner*—Hau V Phan
(74) *Attorney, Agent, or Firm*—Robert J. Clark; Daniel J. Whitman; Joseph J. Pophal

(57) ABSTRACT

A hydraulic axle combination includes a housing having first and second pump chambers containing spaced, axially aligned, first and second hydrostatic pumps with respective pump shafts and input gears; first and second hydraulic motors connected with respective first and second pumps via intermediate manifold blocks thereby enabling closed-loop internal drive systems between the associated pumps and motors and forming first and second independent hydrostatic transmissions wherein the hydraulic motor output shafts serve as first and second axle shafts; an input shaft, extending between the two transmissions, includes a gear for supplying torque to and meshing perpendicularly with the pump shaft input gears and forming, therewith a T-shaped gear box, the housing optionally including: an internal sump serving as an integral combination fluid reservoir for the axle combination, at least one breather cap, a fluid filter assembly and a drain port and plug, all mounted in various housing sides.

34 Claims, 13 Drawing Sheets

U.S. PATENT DOCUMENTS

| | | |
|---|---|---|
| 6,457,560 B1 | 10/2002 | Evans et al. |
| 6,550,243 B2 * | 4/2003 | Hauser et al. ................. 60/487 |
| 6,609,889 B1 | 8/2003 | Vilsboll |
| 6,705,840 B1 | 3/2004 | Hauser et al. |
| 6,843,056 B1 | 1/2005 | Langenfeld et al. |
| 6,973,783 B1 * | 12/2005 | Hauser et al. ................. 60/484 |
| 7,083,014 B2 * | 8/2006 | Forster ..................... 180/53.4 |

* cited by examiner

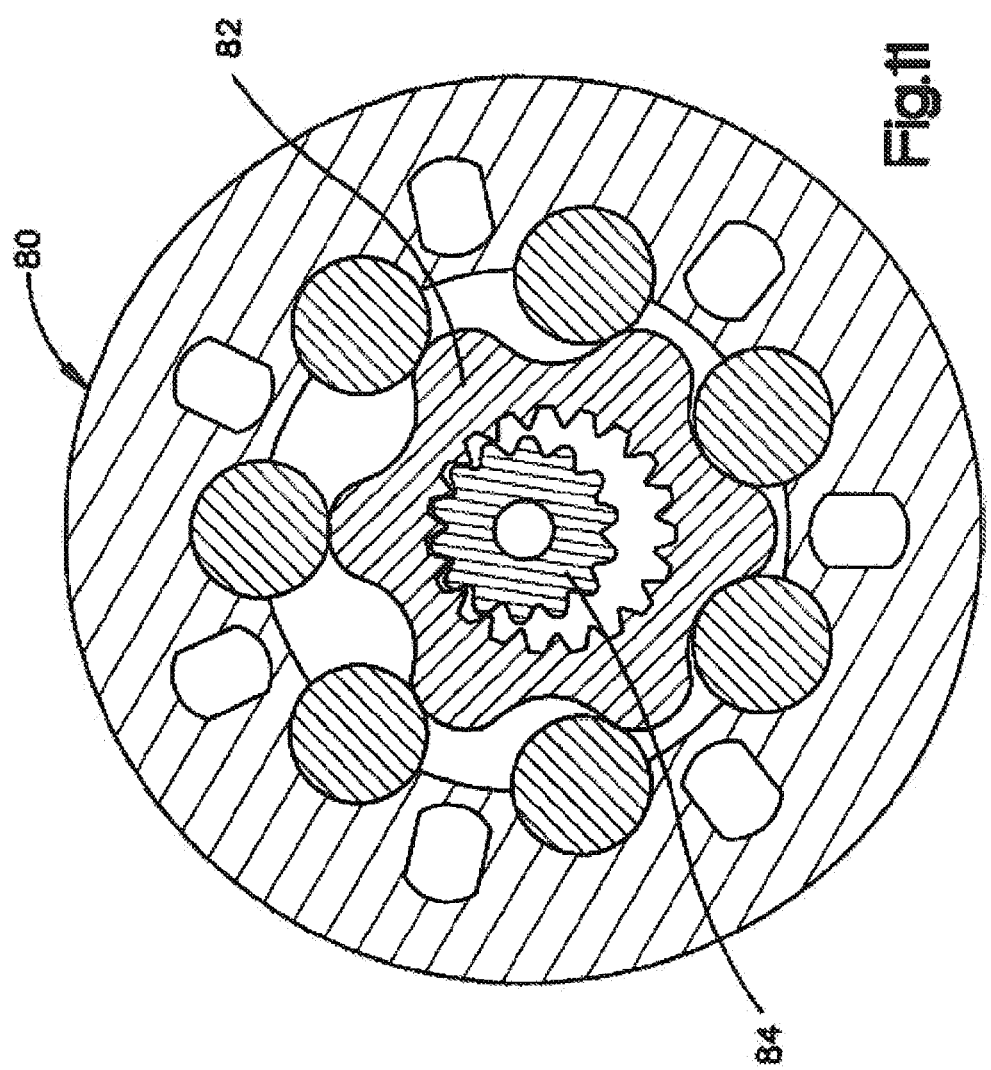

HYDRAULIC AXLE COMBINATION

CROSS REFERENCE TO RELATED APPLICATIONS

The present application claims the benefit of the filing date of U.S. Provisional Patent Application Ser. No. 60/676,384, filed Apr. 29, 2005, the disclosure of which is incorporated herein by reference.

FIELD OF THE INVENTION

The present invention pertains to a hydraulic axle combination or transaxle assembly that utilizes spaced, axially aligned, independent hydrostatic transmissions each having respective pump portions thereof located in a housing and having axially aligned hydrostatic pumps operatively interconnected with respective hydraulic motors, where in the motor output shafts serve as opposed axle shafts. An input shaft extending into the housing between the transmissions includes an input gear for supplying torque meshing perpendicularly with opposed pump input shaft gears and forming therewith a T-shaped gear box. Housing options include an integral internal fluid reservoir at least one breather cap, a fluid filter assembly as well as a drain port and plug.

BACKGROUND OF THE INVENTION

The hydraulic axle combinations of the present invention are, for example, utilized in powered, wheeled, drive units that typically find utility in known, zero-turn-radius (ZTR) vehicles. Such a ZTR vehicle often takes the form of a grass or lawn mowing machine having at least one cutting blade. A ZTR vehicle utilizes a single prime mover or engine that drives a separate, independent transmission for each of its left and right side rear driving wheels. Independent front left and right side wheels are usually caster-type wheels that are free to pivot about their vertical clevis axes, in a manner well known in the art. Today, most commercial ZTR machines are driven by separate, dual, hydrostatic transmissions, for left and right driven wheels. Each such transmission preferably includes its own closed-loop circuit and both transmissions function independently and can, for example, be operated or controlled via their human operator-actuated right and left control levers. In one such mode of operation, each of control levers is linked to a respective trunnion shaft of an associated hydraulic pump and enables the operator to control the direction and amount of fluid flow from each transmission pump. When the operator pushes a lever in one direction, the associated pump delivers fluid flow in one direction of corresponding motor operation. When the operator pushes the lever in the opposite direction, the associated pump delivers fluid flow in the opposite direction of corresponding motor operation. Thus, the use of dual hydrostatic transmissions permits the zero-turn-radius features of these vehicles, which is an important feature, particularly in commercial mowers.

The patent literature includes a large number of designs and structures pertaining to hydraulic axle combinations and hydraulic transaxles, including but not limited to the following: U.S. Pat. No. 2,780,424 to Price; U.S. Pat. No. 2,996,135 to Grabow; U.S. Pat. No. 4,280,579 to Zaunberger et al.; U.S. Pat. No. 6,182,784B1 to Pestonik; U.S. Pat. No. 6,457,560B1 to Evans et al.; U.S. Pat. No. 6,705,840B1 to Hauser et al.; and U.S. Pat. No. 6,843,056B1 to Langenfeld et al., some of which will be discussed hereinafter. U.S. Pat. No. 2,780,424 merely shows an application for a "T" gearbox to drive a mechanical system, while U.S. Pat. No. 4,280,579 discloses a control for a tracked vehicle steering system comprised of discrete separate components that also include additional gear reducers that are not required in the structures of the present invention due to its usage of low speed, large displacement, high torque gerotor orbital motors in a purely hydrostatic transmission. U.S. Pat. No. 6,182,784 discloses a drive train that uses a "T" gearbox to drive both axles at the same speed whereas, in the structure of the present invention, a "T" gearbox is used to drive two independent hydrostatic pumps, with each pump being coupled with a hydraulic motor whose output shaft functions as an axle to drive a wheel, thus permitting the two axles to rotate at differing speeds and even in opposite directions, if so desired. U.S. Pat. No. 6,457,560B1 pertains to a gearbox oil pumping system associated with a riding mower, showing a plurality of individual oil conduits connecting dual oil pumps to dual fluid motors as well as an oil radiator, an oil reservoir and dual oil filters. U.S. Pat. No. 6,705,840B1 discloses several embodiments of an inline tandem pump apparatus having a pair of coaxially arranged pump shafts and a separate input shaft that is not coaxial with the pump shafts. The pump outputs are connected to remote hydraulic motors. U.S. Pat. No. 6,843,056B1 pertains to a zero turn transaxle comprised of a hydraulic transmission having a pair of hydraulic pumps connected with axially offset hydraulic motors that drive output axles. However, none of these prior art structures teach or suggest the structural and functional features of the present invention.

SUMMARY OF THE INVENTION

Accordingly, in order to overcome the deficiencies of the prior art devices, the present invention provides a single unit design and structure of a hydrostatic transaxle including two hydrostatic pumps, two hydraulic motors and a "T" gearbox wherein only one input shaft is used to receive power from a prime mower, operating at high speed and two output shafts are used to drive left and right side wheels at a much lower speed.

Specifically, one embodiment of this invention pertains to a hydraulic axle combination comprising: a. a housing having a first pump chamber and a second pump chamber; b. a first hydrostatic pump, having a first pump shaft, rotatably mounted within the first pump chamber; c. a second hydrostatic pump, having a second pump shaft, rotatably mounted within the second pump chamber; d. an input shaft, mounted in and extending into the housing, having a gear, mounted on an intermediate portion thereof, supplying torque to an intermeshing input gear mounted on one end of each of the first and second pump shafts; e. a first hydraulic motor in operative interconnection with the first hydrostatic pump; f. a second hydraulic motor in operative interconnection with the second hydrostatic pump; and g. each of the first and second hydraulic motors including a respective first and second coaxial, rotatably journalled, output shaft, the first and second output shafts serving as respective first and second axle shafts.

In one version thereof, each of the operative interconnections includes a respective manifold block structurally and operatively interposed between its associated hydrostatic pump and hydraulic motor, thereby enabling a closed-loop drive system between the associated hydrostatic pumps and hydraulic motors. In a variation thereof, the first hydrostatic pump, together with the first hydraulic motor and their associated manifold block, forms a first, independent hydrostatic transmission. In another variation thereof, the second hydrostatic pump, together with the second hydraulic motor and their associated manifold block, forms a second, independent hydrostatic transmission. In a further variation thereof, the first and second, independent transmissions are substantially similar, coaxial, mirror-image versions of each other. In an additional variation thereof, the input shaft gear is perpendicular to and intermeshes with the input gears and together therewith forms a T-shaped gear box, the gear box being operatively and physically interposed between the first and second independent hydrostatic transmissions and together therewith comprising the hydraulic axle combination.

In another version thereof, the first and second pump shafts are perpendicular to the input shaft.

In a differing version thereof, the first and second pump shafts are coaxially aligned.

In a further version thereof, the housing includes an integral sump, the sump serving as a single, internal, combination fluid reservoir for the first and second hydrostatic pumps as well as the first and second hydraulic motors. A further variation includes at last one case drain port and plug in a bottom side of the housing. An additional variation thereof includes at least one breather cap in a top side of the housing.

A still further variation thereof includes a fluid filter assembly operatively interconnected with the sump at a rear side of the housing.

A yet additional version thereof further includes a charge pump, mounted on a distal end of the input shaft, operatively interconnected with at least one of the first and second hydrostatic pumps. In a variation thereof, the charge pump is mounted on a bottom side of the housing.

In an added version, a top side of the housing includes a cover, with the input shaft extending into the housing through the cover.

In yet another added version, each of the first and second hydraulic motors takes the form of a gerotor-type orbital motor. In a variation thereof, the gerotor-type motor is an externally generated gerotor motor.

In a still differing version, the input shaft gear is perpendicular to the intermeshing input gears and together therewith forms a T-shaped gear box, with the gear box being physically located intermediate the first and second pumps.

Another differing version further includes at least one breather cap in a top side of the housing.

A still further version further includes, on a top side of the housing, a plurality of spaced attachment bosses, for attaching the axle combination to a chassis member of a powered, wheeled, drive unit. In a variation thereof, the chassis member includes a plurality of apertures corresponding in location to the plurality of attachment bosses and a plurality of fastening members for uniting the hydraulic axle combination with the chassis member.

A further embodiment of this invention pertains to a hydraulic transaxle assembly comprising in combination: a. a central housing having opposed, spaced, axially aligned, first and second pump chambers; b. a first hydrostatic pump, having a first pump shaft, operatively mounted in the first pump chamber; c. a first hydraulic motor axially aligned with and in operative as well as structural interconnection with the first hydrostatic pump, the first hydraulic motor including a first rotatable, coaxial, output shaft serving as a first axle shaft; d. a first manifold block structurally and operatively interposed between the first hydrostatic pump and the first hydraulic motor and together therewith enabling a first closed-loop drive system and forming a first, independent, hydrostatic transmission; e. a second hydrostatic pump, having a second pump shaft, operatively mounted in the second pump chamber; f. a second hydraulic motor axially aligned with and in operative as well as structural interconnection with the second hydrostatic pump, the second hydraulic motor including a second rotatable, coaxial, output shaft serving as a second axle shaft; g. a second manifold block structurally and operatively interposed between the second hydrostatic pump and the second hydraulic motor and together therewith enabling a second closed-loop drive system and forming a second, independent, hydrostatic transmission; and h. an input shaft, mounted in and extending into the housing between the first and second hydrostatic pumps, including a gear mounted on an intermediate portion thereof, supplying torque to and perpendicularly intermeshing with the first and second input gears mounted on respective ones of the first and second pump shafts and forming therewith a T-shaped gear box, the gear box, together with the first and second, independent hydrostatic transmissions comprising the hydraulic transaxle assembly.

In one version thereof, the first and second, independent, transmissions are substantially similar, coaxial, mirror-image versions of each other.

In another version thereof, the central housing includes an integral, internal sump The sump serves as a single, integral, combination fluid reservoir for at least the first and second hydrostatic transmissions. One variation thereof further includes at least one drain port and plug in the integral sump in a bottom side of the housing. Another variation thereof further includes at least one breather cap in a top side of the housing. A further variation thereof further includes a fluid filter assembly operatively interconnected with the sump at a rear side of the housing.

An additional version thereof further includes a charge pump, mounted on a distal end of the input shaft, operatively interconnected with at least one of the first and second hydrostatic pumps. In one variation thereof, the charge pump is mounted on the outside of a bottom surface of the housing.

In a further version, a top side of the housing includes a cover, with the input shaft extending into the housing through an aperture in the cover.

In a differing version, each of the first and second hydraulic motors takes the form of an externally generated gerotor type orbital motor.

A still another version further includes at least one breather cap in a top side of the housing.

A yet additional version further includes, on a top side of the housing, a plurality of spaced attachment bosses for attaching the transaxle assembly to a frame of a vehicle. In a variation thereof, the frame member includes a plurality of apertures, each corresponding in location with the plurality of attachment bosses and a further corresponding plurality of fastening members for structurally uniting the transaxle assembly with the frame.

Another embodiment of this invention pertains to a powered, wheeled, drive unit for a vehicle including: a. the transaxle assembly of the previous embodiment; b. a frame, with the frame including a plurality of apertures, corresponding in location with the plurality of attachment bosses and a further corresponding plurality of fastening members for structurally uniting the transaxle assembly with the frame; c. a prime mover, affixed to the frame, operatively interconnected with the input shaft gear for supplying the torque; and d. first and second drive wheels, each including a pneumatic tire, affixed to respective ones of the first and second axle shafts.

A further embodiment of this invention pertains to a zero-turn-radius vehicle utilizing the powered, wheeled, drive unit of the immediately previously described embodiment.

The previously-described advantages and features, as well as other advantages and features, will become readily apparent from the detailed descriptions of the best modes of the preferred embodiments that follow.

DESCRIPTION OF THE DRAWINGS

FIG. 11 is an enlarged sectional view, taken along line 11-11 of FIG. 6, showing a cross section of a sample hydraulic motor power element (gerotor gear set) utilized in this hydraulic axle combination;

DETAILED DESCRIPTION OF THE INVENTION

Figure 1:
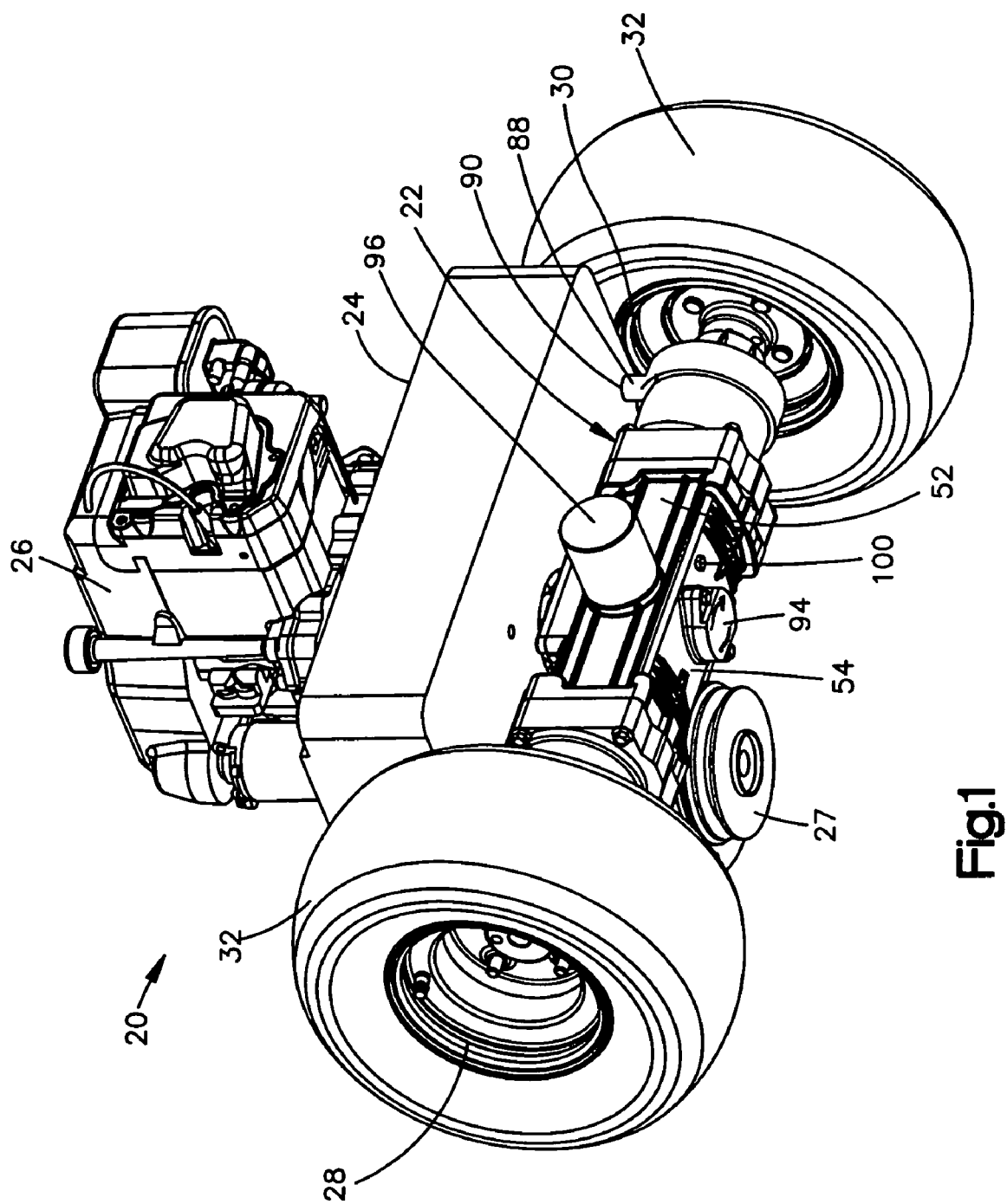
FIG. 1 is a perspective view of the rear and bottom sides of a powered, wheeled, drive unit in which the hydraulic axle combination of the present invention forms an integral part.
Figure 2:
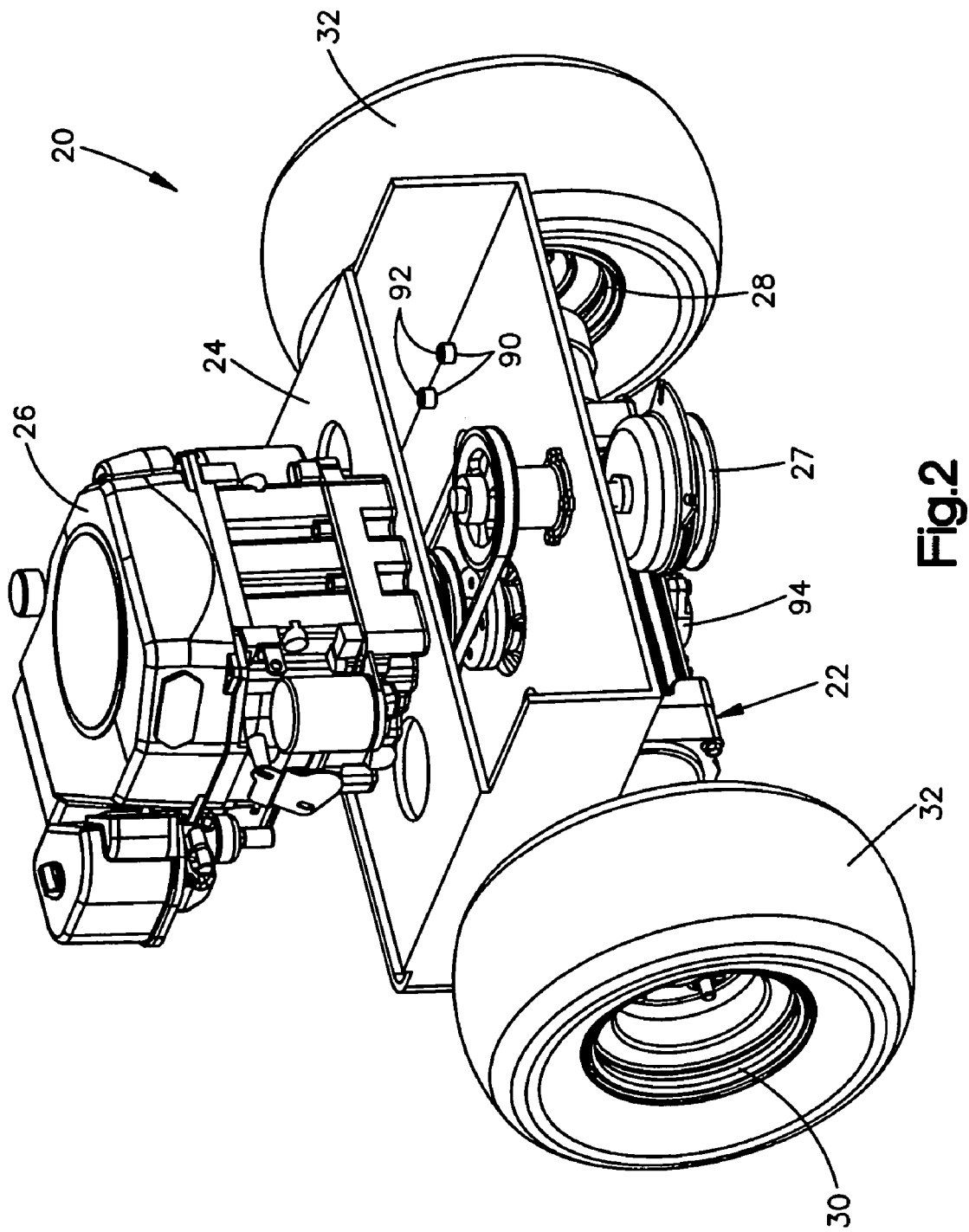
FIGS. 2 and 3 are oppositely directed, perspective, views of the front side and chassis of the powered, wheeled, drive unit in which the hydraulic axle combination of the present invention is utilized.
Figure 3:
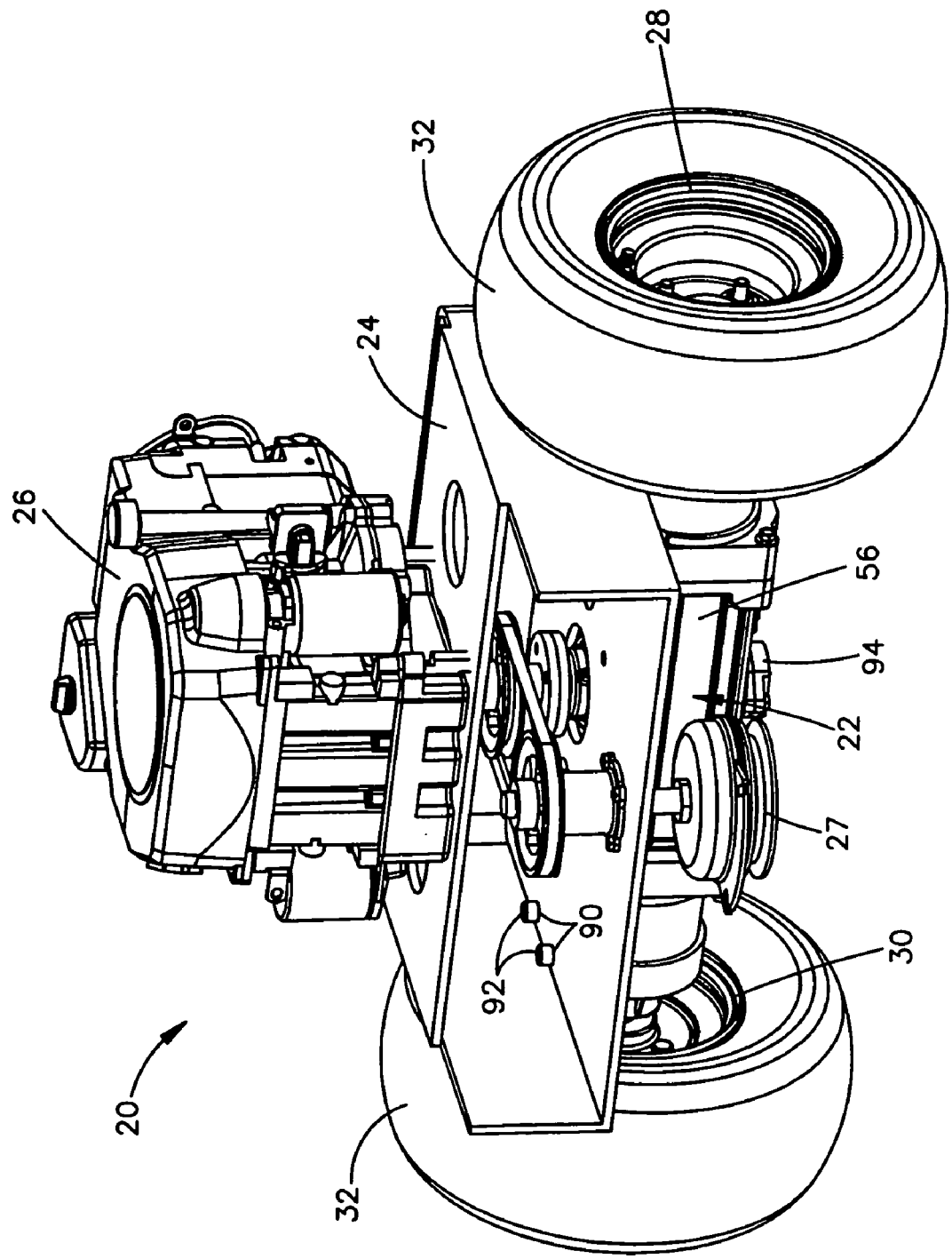

Referring now to the plurality of drawings, illustrated in FIGS. 1-3 are several perspective views of a powered, wheeled, drive unit, generally indicated at 20, in which the hydraulic axle combination or transaxle 22, of the present invention, forms an integral part. Drive unit 20, in addition to hydraulic axle combination 22, mounted on a formed chassis or frame 24, includes an internal combustion engine 26 mounted on chassis 24; an optional, clutch mechanism 27 also mounted on chassis 24; and opposed, laterally spaced first, such as left, and second, such as right, drive wheels 28, 30, each equipped with a pneumatic tire 32.

Figure 4:
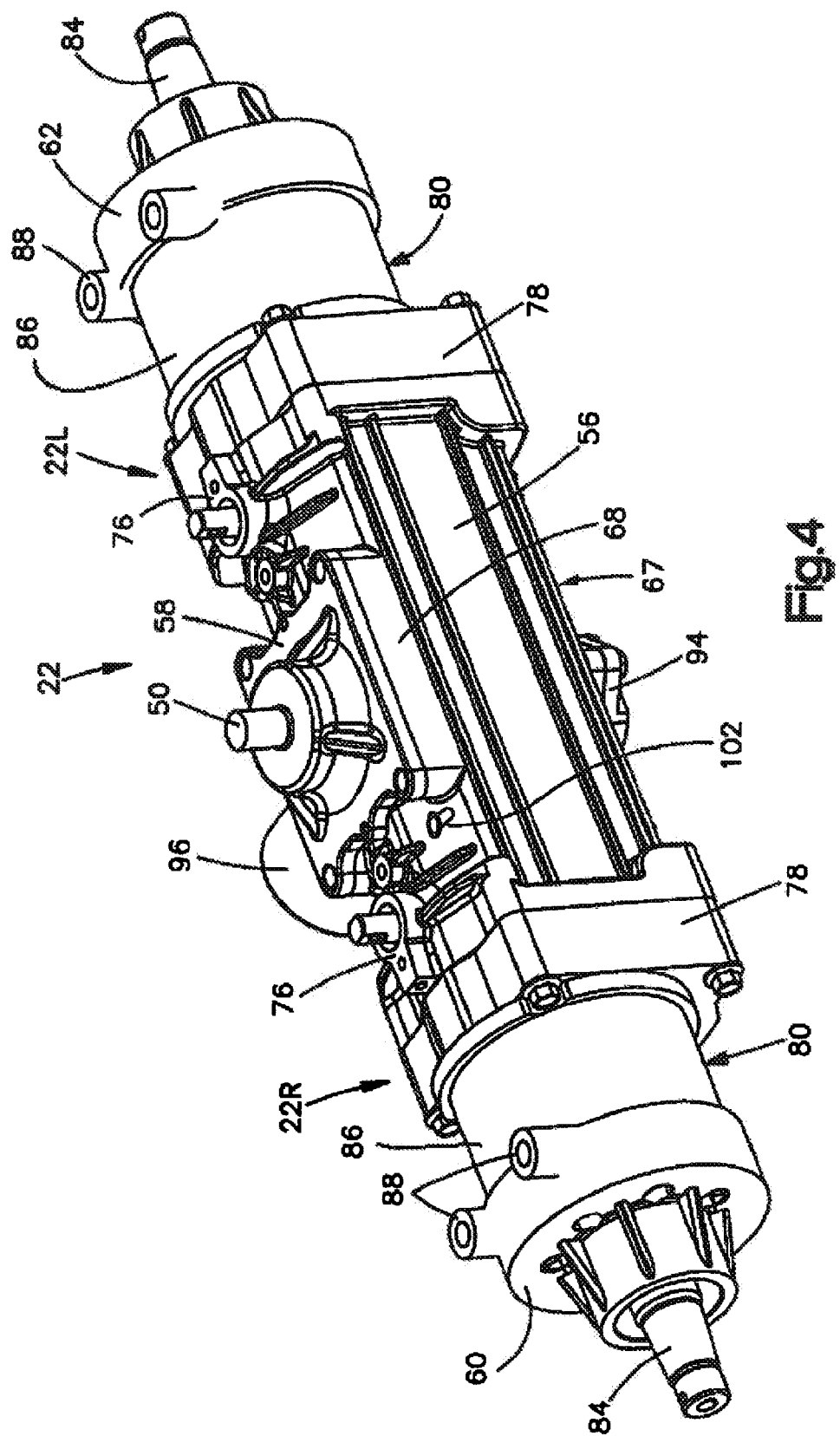
FIG. 4 is a perspective view of the front and top sides of the hydraulic axle combination of this invention.
Figure 10:
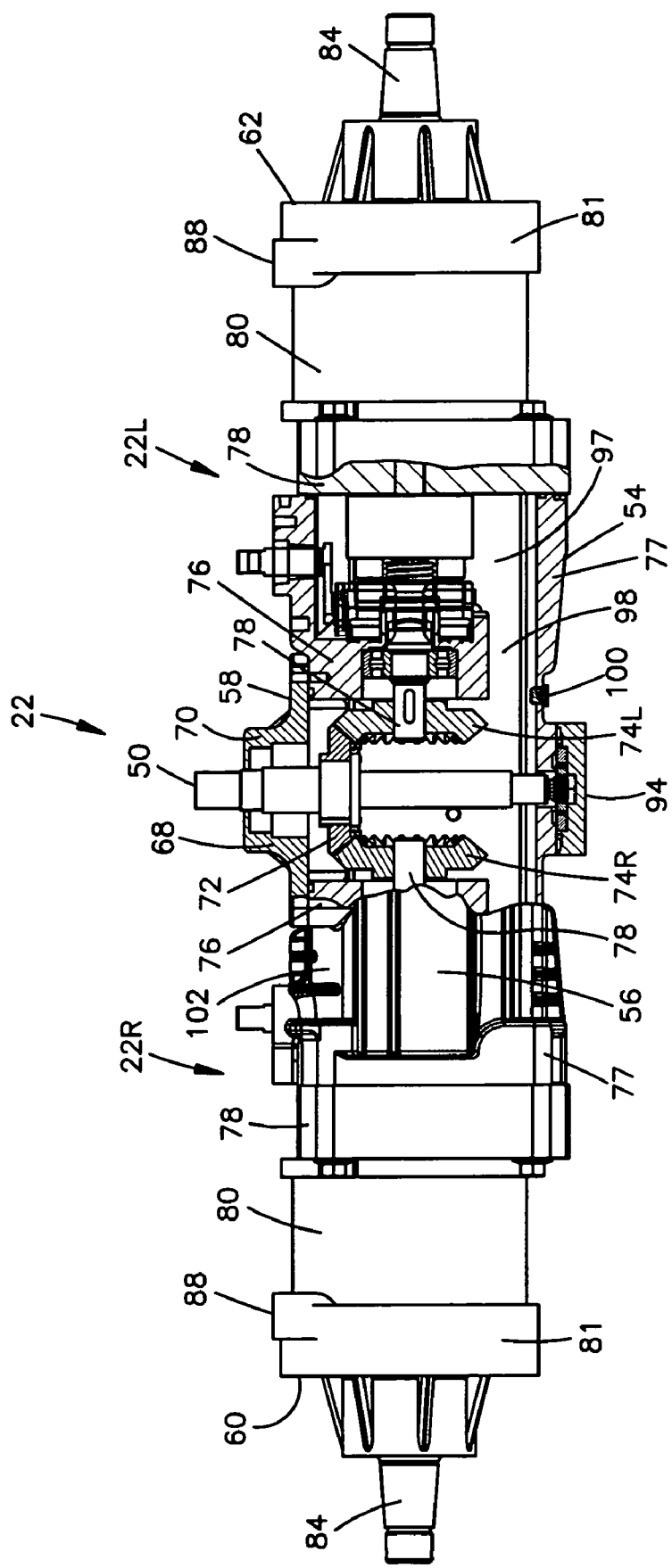
FIG. 10 is a partial sectional view, with parts broken away, taken along line 10-10 of FIG. 8.

Specifically, drive unit 20, including hydraulic axle combination 22, typically finds utility in the previously-described, known, ZTR vehicle. In hydraulic axle combination 22, engine 26, via clutch unit 27 and associated belt and pulley drives (not known in detail in order to reduce complexity) drives but a single axle input shaft 50, as best seen in FIGS. 4 and 10. Returning now to FIGS. 1-3, FIG. 1 is a perspective view of the rear and bottom sides of drive unit 20, showing the rear side 52 and bottom side 54 of axle combination 22, while FIG. 2, which is a perspective view of the front and bottom sides of drive unit 22, shows front side 56 and bottom side 54 of axle combination 22. With FIG. 3, which is a perspective view of the rear side and the chassis of axle combination 22, again shows the front side 56 of axle combination 22 together with clutch unit 27. All of these structures will be explained in more detail hereinafter.

Figure 5:
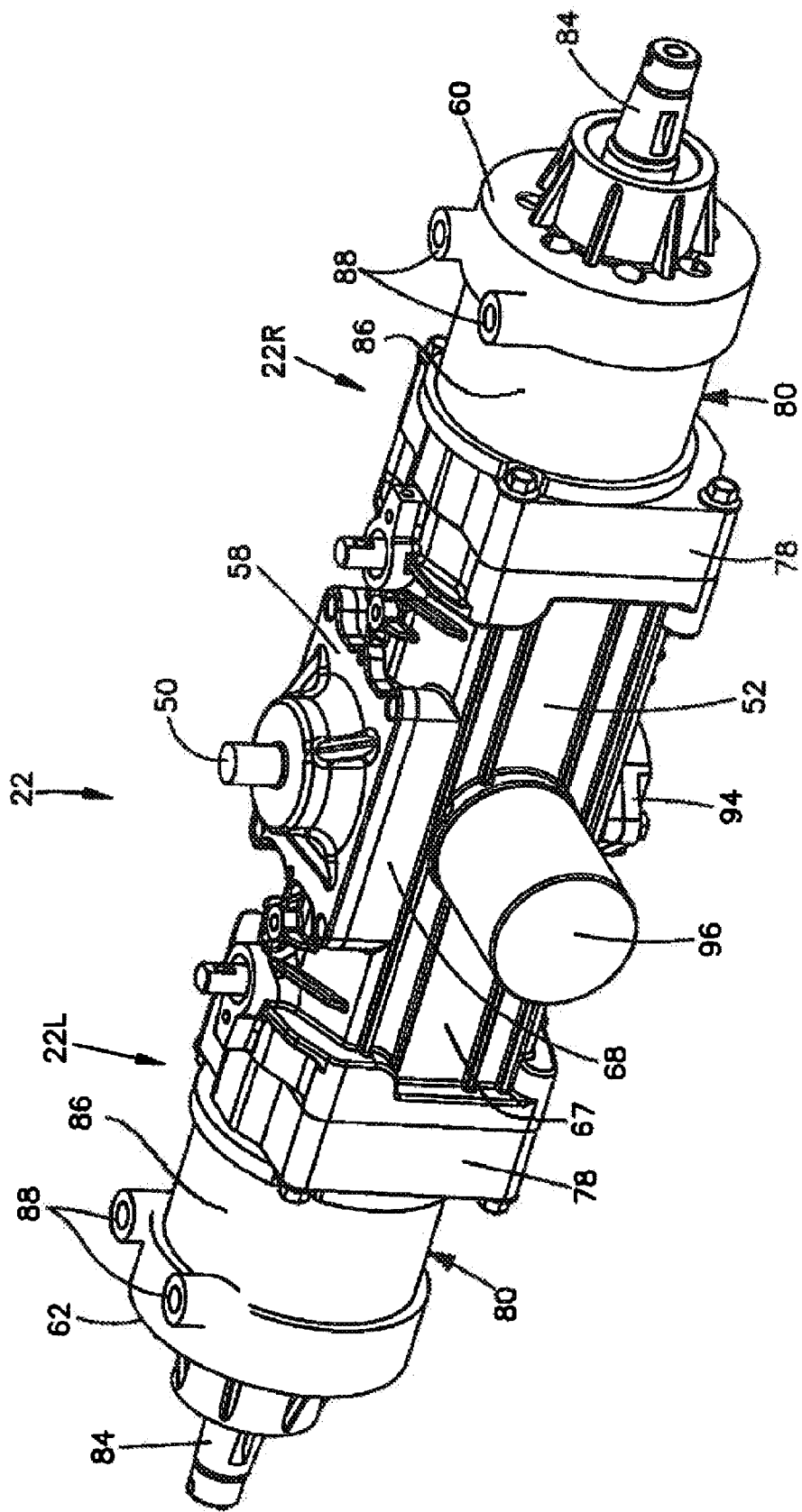
FIG. 5 is a perspective view of the rear and top sides of this hydraulic axle combination.
Figure 6:
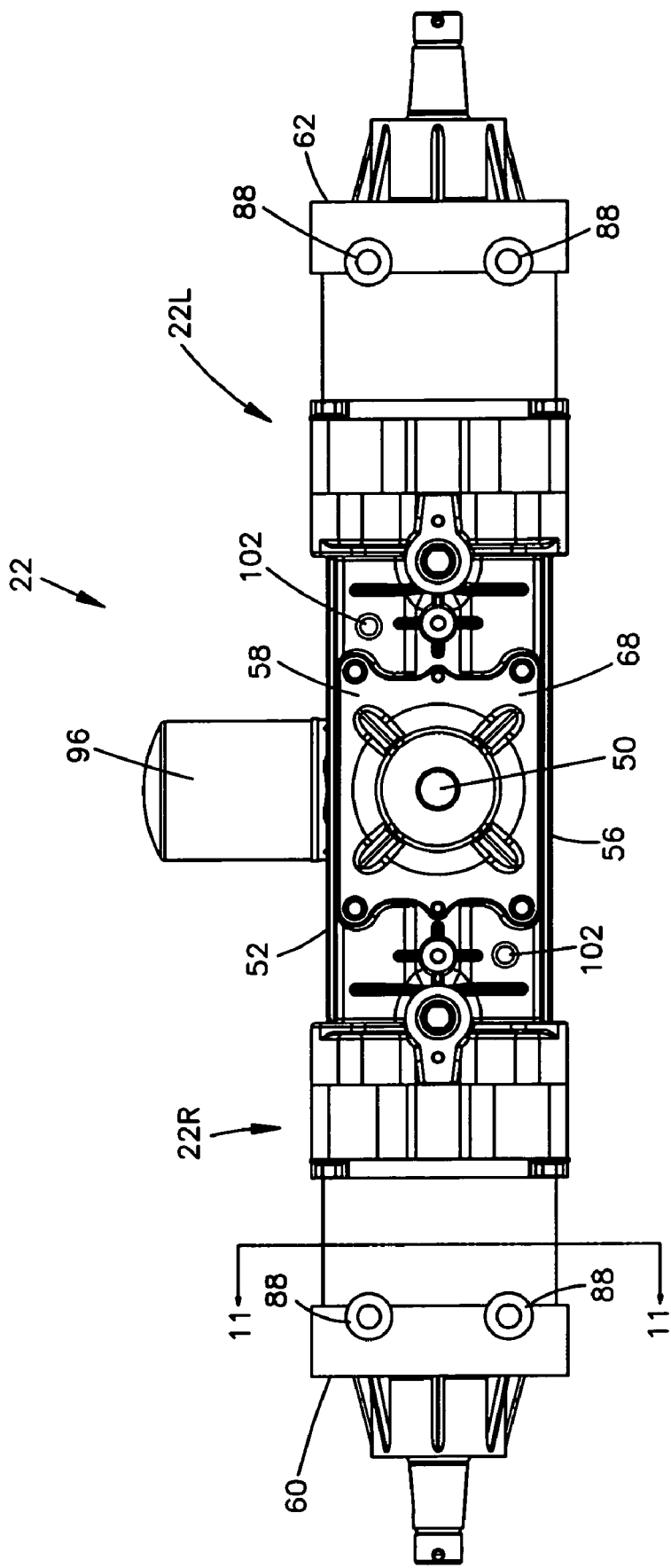
FIG. 6 is a top plan view of this hydraulic axle combination.
Figure 7:
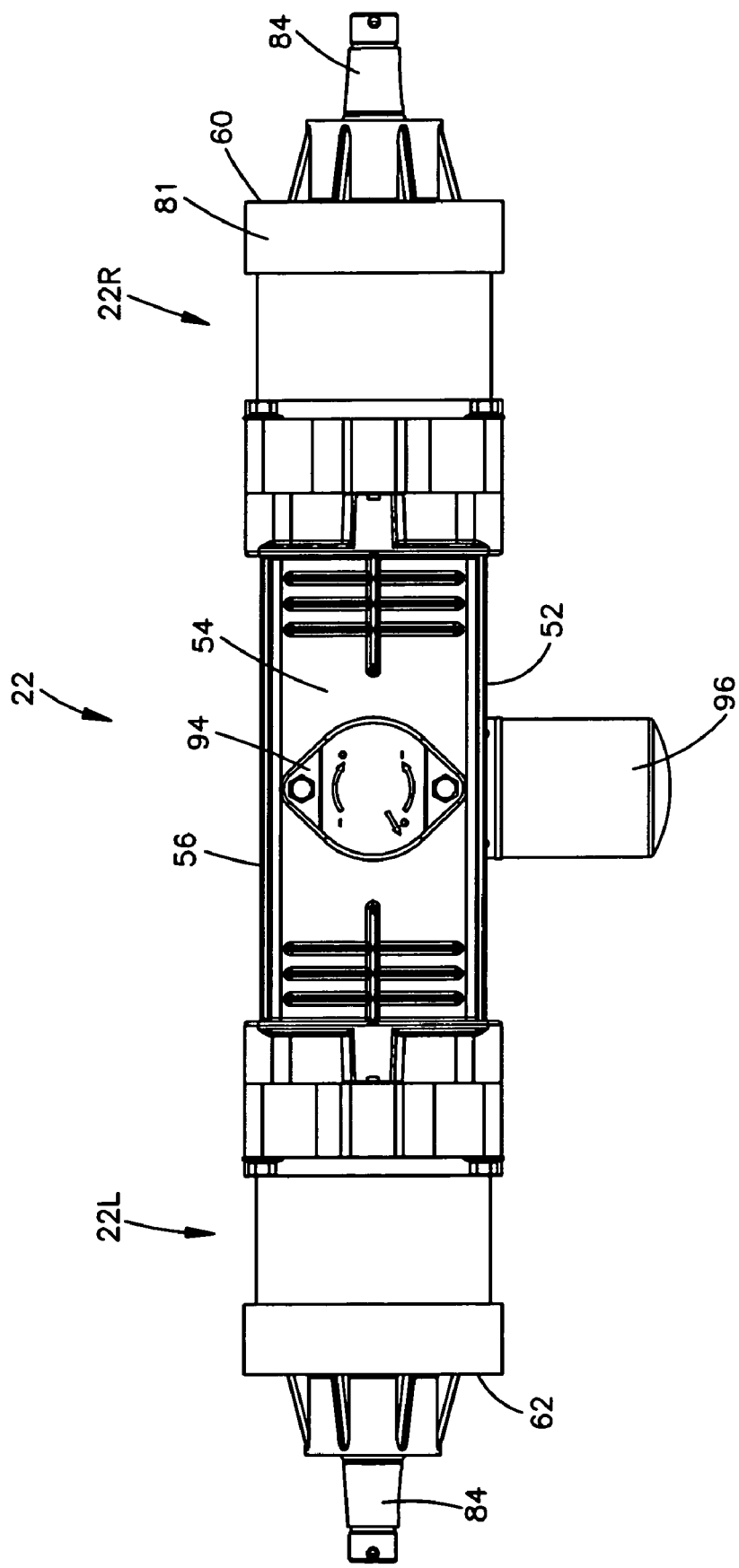
FIG. 7 is a bottom plan view of this hydraulic axle combination.
Figure 9:
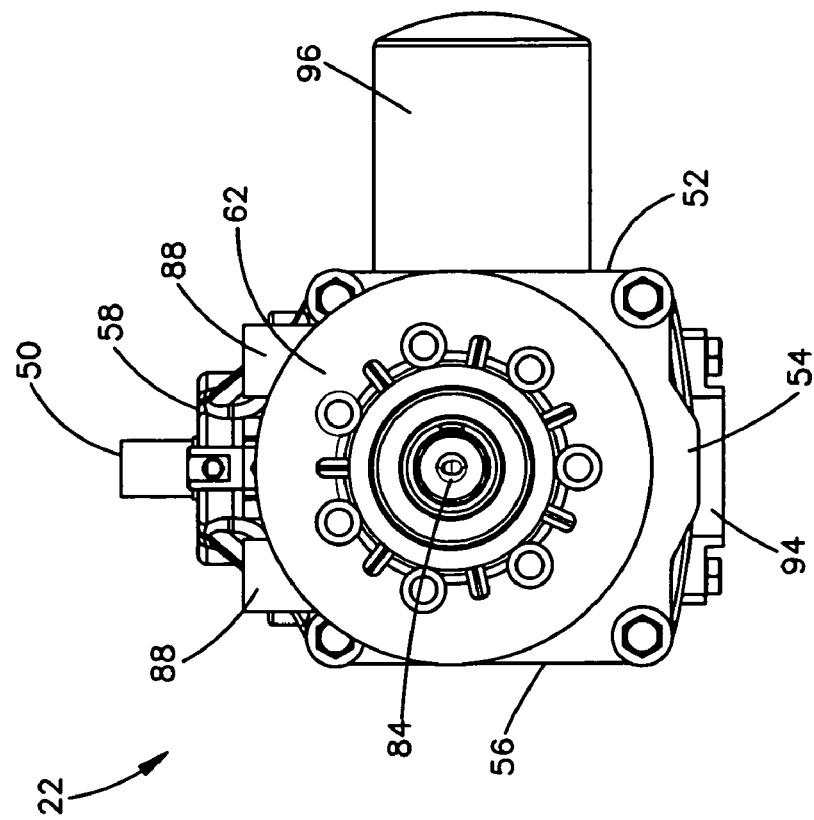
FIG. 9 is an end view of a second end of this hydraulic axle combination.
Figure 8:
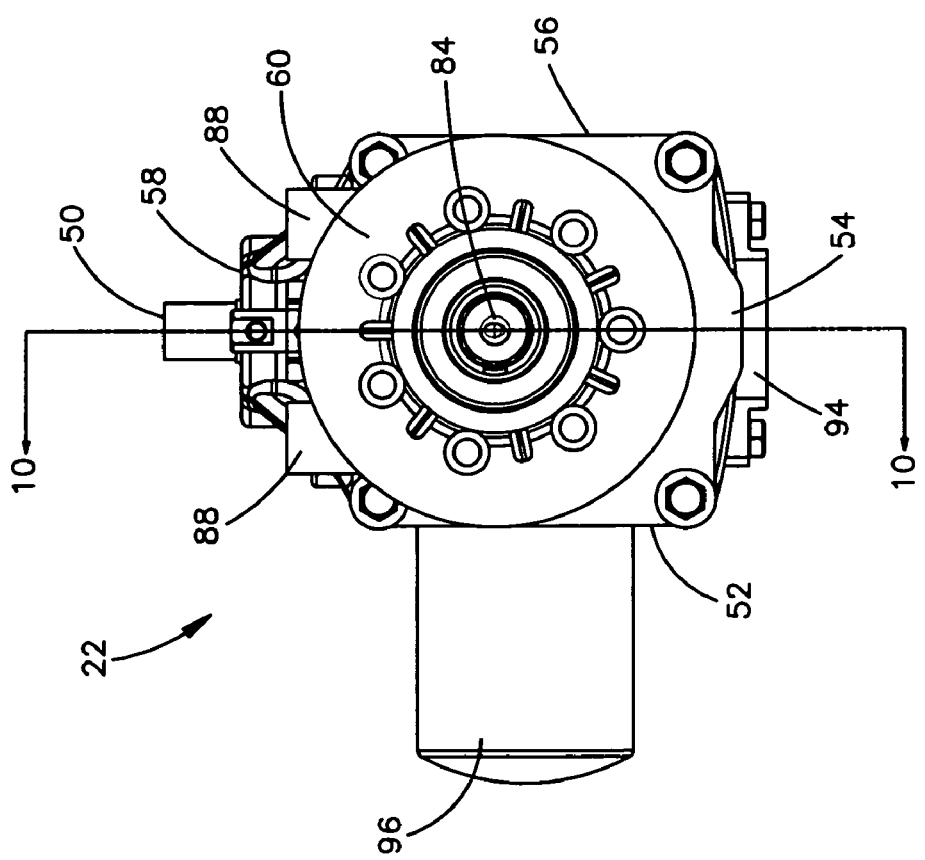
FIG. 8 is an end view of a first end of this hydraulic axle combination.
Figure 10A:
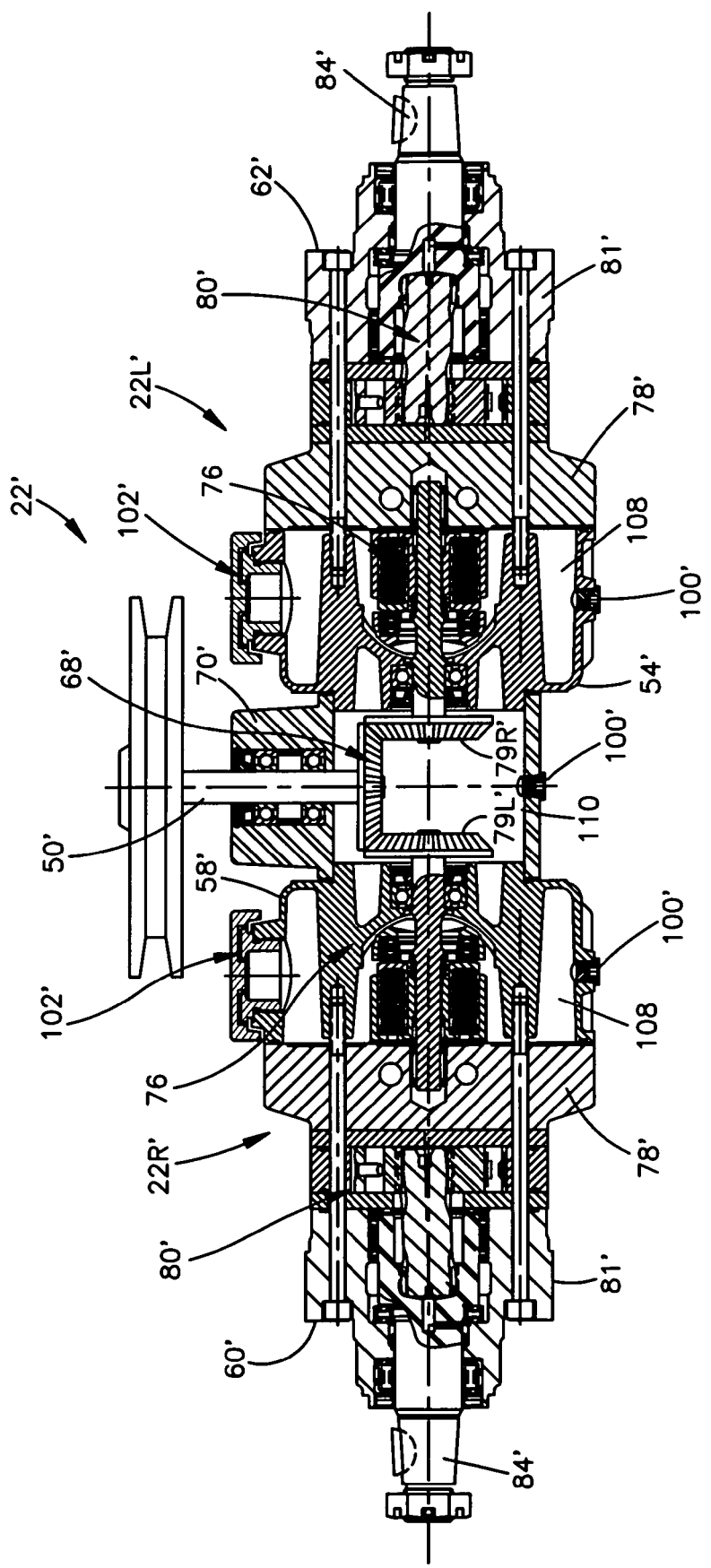
FIG. 10A is a full sectional view, of a variation of the hydraulic axle combination of FIG. 10.
Figure 12:
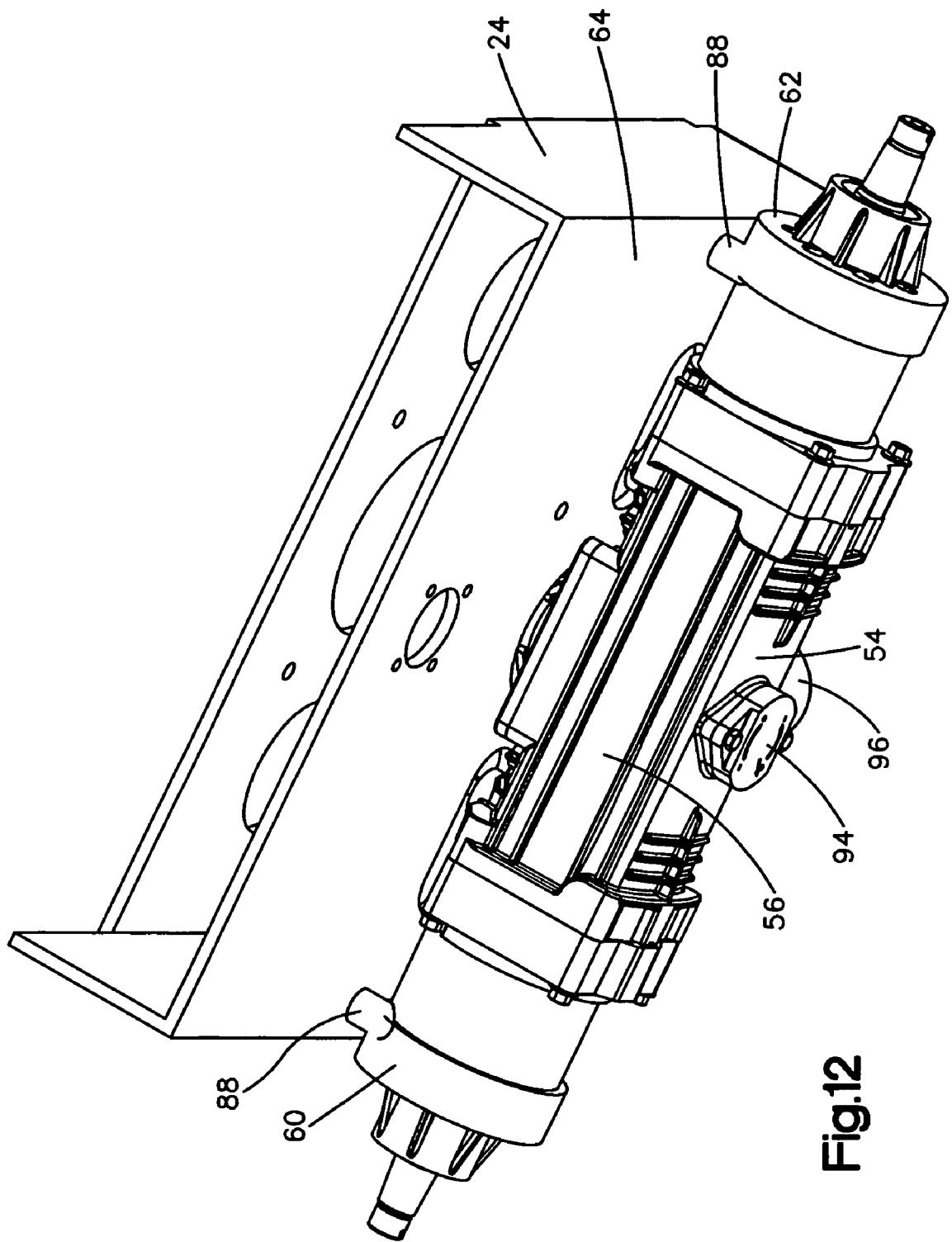
FIG. 12 is a reduced scale perspective view of the front and bottom sides of this hydraulic axle combination, with the top side thereof being affixed to the outer bottom surface of the driven unit.
Figure 13:
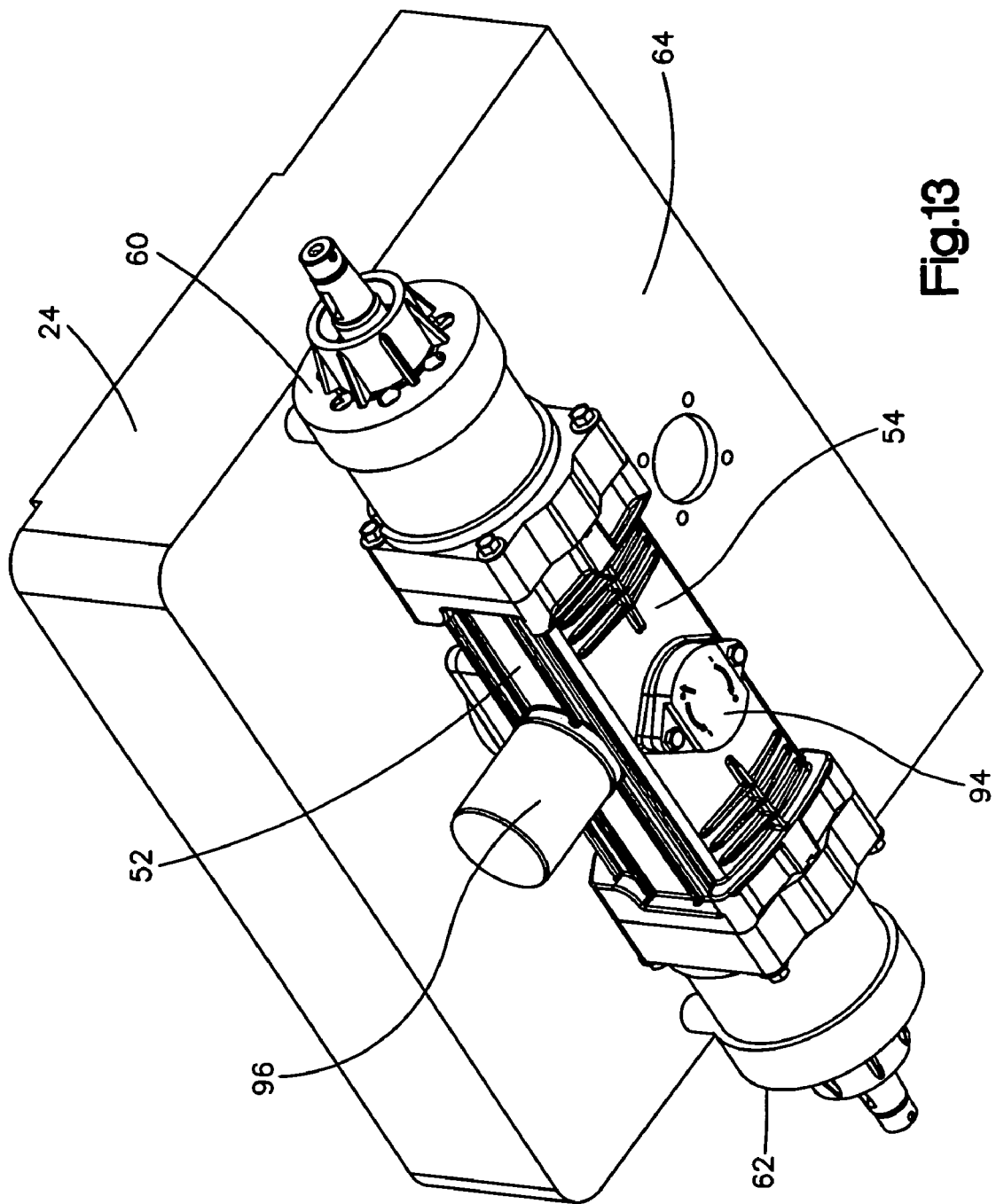
FIG. 13 is a reduced scale perspective view of the rear and bottom sides of the hydraulic axle combination, with the top side thereof being affixed to the outer bottom surface of the driven unit.

FIGS. 4 and 5 are perspective views of the front and top sides 56, 58 and rear and top sides 52, 58, respectively of axle combination 22. Similarly, FIGS. 6 and 7 are plan views of top side 58 and bottom side 54, respectively. FIGS. 8 and 9 are views of a first, or right, end 60 and a second, or left, end 62 of axle combination 22, respectively. FIG. 10 is a partial sectional view, with parts broken away, of FIG. 8 and illustrates some of the internal components of axle combination 22. While FIG. 10A is a full sectional view of a variation 22' of axle combination 22. FIGS. 12 and 13 are reduced scale perspective views of front and bottom sides 56, 54 and rear and bottom sides 52, 54, respectively, of axle combination 22, with the top side 58 thereof (hidden in these views) being affixed to an outer bottom surface 64 of chassis 24. More detailed explanations will follow.

Returning now to FIGS. 4-6 and 10, axle combination 22 includes a central or main housing 67 that includes a T-shaped gear box portion 68 having axially spaced, open, ends and a gear box cover 70 that serves to rotatably journal input shaft 50. Affixed to an intermediate portion of input shaft 50 is a pinion gear 72 that meshes with opposed beveled ring gears 74L, 74R, with suffixes L and R referring to Left and Right, since axle combination 22 is comprised of coaxial, allochiral or mirror-image Left and Right transmission portions 22L, 22R, housed within main housing 67 on opposite sides of gear box portion 68. Each of substantially similar transmission portions 22L, 22R, includes a closed loop drive system having at least one known hydrostatic pump 76, for example a swashplate-type piston pump, such as one of the known H1A pump series available from the Parker Hannifin Corporation of Cleveland, Ohio, U.S.A. An input shaft 78 of each of pumps 76 has one of ring gears 74L, 74R affixed thereon, as best seen in FIG. 10. The axial outer end of each of pumps 76 is connected, via any appropriate manifold block 78, with a hydraulic motor 80, for example a externally generated (EGR) gerotor motor, such as one of the known TL gerotor type motors, also available from the Parker Hannifin Corporation. The use of a gerotor orbital motor 80 obviates the use of any additional gear reduction devices. FIG. 11 illustrates a cross section of a typical EGR motor and shows the internal splines of the gerotor inner rotor or ring gear 82 in orbital mesh with the outer splines of rotatably journalled output shaft 84. As seen in FIGS. 4-6, each of hydrostatic motors 80 is provided, as part of its outer housing 86, in axle combination top side 58, with a pair of outwardly-extending, spaced, apertured and threaded bosses or flanges 88 adapted for alignment with similarly spaced apertures 90 (FIGS. 1-3) in chassis bottom portion 66 for bolting together and thus, joining axle combination 22 to and with chassis 24 via bolts 92.

Even though two transmission portions 22L and 22R are utilized, preferably only one centralized charge pump 94, hydraulically interconnected with at least one of main pumps 76, is used. The charge pump 94 is driven by the distal end of axle input shaft 50 and is located at axle combination bottom side 54, as best seen in FIGS. 7 and 10. Similarly, hydraulic axle combination 22 optionally uses but a single hydraulic fluid filter 96, preferably of the known spin-on type, located at axle combination rear side 52 for easy access. As shown in FIG. 10, a continuous, internal housing sump 97, which includes gear box housing 70 and the internal housing portions 77 of each piston pump 76, functions as an integral fluid reservoir 98 for axle combination 22. Integral reservoir 98 can be drained either by removing fluid filter 96 or by removing an optional drain plug 100 (FIGS. 1 and 10) in axle combination bottom side 54. Similarly, as best seen in FIGS. 4 and 6, at least one and preferably two optional breathers or breather caps 102 can be added to axle combination top surface 58.

FIG. 10A illustrates a variation 22' of hydraulic axle combination 22 with like parts being denominated by like numerals followed by the suffix prime. In the interest of brevity, no further discussion of such like parts will be made. Axle combination 22' differs from axle combination 22 in that the former does not utilize axle input shaft 50' to also drive a charge pump in addition to driving beveled ring gears 74L' and 74R'. In addition, hydrostatic transmission portions 22L' and 22R' each utilize an individual internal hydraulic fluid reservoir 108 as well as drain plug 100'. If so desired, hydraulic fluid reservoir 110 of gear box housing 70' can also be provided with a drain plug 100'.

It should be understood, at this time, that the present invention pertains to a single unit design and structure of a hydrostatic transaxle or hydraulic axle combination 22 and 22' that include two hydraulic pumps 76, two hydraulic motors 80 and a T-shaped intermediate gearbox 68. Only one axle input shaft 50 is utilized to receive power from one internal combustion engine 26 operating at a preferably constant speed, for example, normally at about 3600 rpm. Two opposed, coaxial, output shafts 84 are used to drive left and right side wheels 28, 30 at preferably much lower speeds, for example, normally at about 150 rpm. Thus, the structures of hydraulic axle combinations 22 and 22' are very compact and significantly reduce the assembly time, complexity and efforts for end users by the eliminating the usual hoses, filters, separate reservoirs, as well as the fittings required therefore.

Specifically, the single assembly units of axle combinations 22 and 22' include two independent hydrostatic transmissions 22L, 22R and 22L', 22R', respectively. Each of these transmissions includes a closed loop drive system having at least one hydrostatic pump 76 or 76' and one hydraulic motor 80 or 80'. Manifold blocks 78 are used to internally connect piston pumps 76 and gerotor motors 80 in a back-to-back orientation, e.g., so that the input shaft of the pump and the output shaft of the motor are at the opposite end of each of transmission portions or segments 22L and 22R. Thus, the shafts of the two hydrostatic pumps 76 and the two hydraulic motors 80 are of an "in-line" design and configuration, with the two pumps 76 and motors 80 being attached together as but a single unit for ease of assembly. The structure of axle combination 22 includes a sump 97 that serves as an internal, integral, hydraulic fluid reservoir 98 for both transmissions 22L and 22R as well as for T-shaped gear box 68. Associated with reservoir 98 are optional fluid filter 96, case drain port plugs 100 and breathers 102. In addition, an optional charge pump 94 is utilized to supply make-up hydraulic fluid flow to avoid possible pump cavitations due to fluid leakages of the transmissions. Furthermore, axle combinations 22, 22' are mounted directly onto the frame or chassis 24 of powered, wheeled, drive unit 20, together with such other parts like an optional clutch mechanism 27 and internal combustion engine or prime mover 26. The noted mounting of axle combinations 22, 22' onto chassis 24 is accomplished via apertured flanges or bosses 88 located on motor housings 80 thereby increasing the overall rigidity of drive unit 20.

It is deemed that one of ordinary skill in the art will recognize that the several embodiments of the present invention fill remaining needs in this art and will be able to affect various changes, substitutions of equivalents and various other aspects of the invention as described herein. Thus, it is intended that the protection granted hereon be limited only by the scope of the appended claims and their equivalents.

What is claimed is:

1. A hydraulic axle combination comprising:
    a housing having a first pump chamber and a second pump chamber;
    a first hydrostatic pump, having a first pump shaft, rotatably mounted within said first pump chamber;
    a second hydrostatic pump, having a second pump shaft, rotatably mounted within said second pump chamber;
    an input shaft, mounted in and extending into said housing, having a gear, mounted on an intermediate portion thereof, supplying torque to an intermeshing input gear mounted on one end of each of said first and second pump shafts;
    a first hydraulic motor in operative interconnection with said first hydrostatic pump;
    a second hydraulic motor in operative interconnection with said second hydrostatic pump; and
    each of said first and second hydraulic motors including a respective first and second coaxial, rotatably journalled, output shaft, said first and second output shafts serving as respective first and second axle shafts.

2. The hydraulic axle combination of claim 1, wherein each of said operative interconnections includes a respective manifold block structurally and operatively interposed between its associated hydrostatic pump and hydraulic motor, thereby enabling a closed-loop drive system between said associated hydrostatic pumps and hydraulic motors.

3. The hydraulic axle combination of claim 2, wherein said first hydrostatic pump, together with said first hydraulic motor and their associated manifold block, forms a first, independent hydrostatic transmission.

4. The hydraulic axle combination of claim 3, wherein said second hydrostatic pump, together with said second hydraulic motor and their associated manifold block, forms a second, independent hydrostatic transmission.

5. The hydraulic axle combination of claim 4, wherein said first and second, independent transmissions are substantially similar, coaxial, mirror-image versions of each other.

6. The hydraulic axle combination of claim 5, wherein said input shaft gear is perpendicular to and intermeshes with said input gears and together therewith forms a T-shaped gear box, said gear box being operatively and physically interposed between said first and second independent hydrostatic transmissions and together therewith comprising said hydraulic axle combination.

7. The hydraulic axle combination of claim 1, wherein said first and second pump shafts are perpendicular to said input shaft.

8. The hydraulic axle combination of claim 1, wherein said first and second pump shafts are coaxially aligned.

9. The hydraulic axle combination of claim 1, wherein said housing includes an integral sump, said sump serving as a single, internal, combination fluid reservoir for said first and second hydrostatic pumps as well as said first and second hydraulic motors.

10. The hydraulic axle combination of claim 9, further including at last one case drain port and plug in a bottom side of said housing.

11. The hydraulic axle combination of claim 9, further including at least one breather cap in a top side of said housing.

12. The hydraulic axle combination of claim 9, further including a fluid filter assembly operatively interconnected with said sump at a rear side of said housing.

13. The hydraulic axle combination of claim 1, further including a charge pump, mounted on a distal end of said input shaft, operatively interconnected with at least one of said first and second hydrostatic pumps.

14. The hydraulic axle combination of claim 13, wherein said charge pump is mounted on a bottom side of said housing.

15. The hydraulic axle combination of claim 1, wherein a top side of said housing includes a cover, with said input shaft extending into said housing through said cover.

16. The hydraulic axle combination of claim 1, wherein each of said first and second hydraulic motors takes the form of a gerotor-type orbital motor.

17. The hydraulic axle combination of claim 16, wherein said gerotor-type motor is an externally generated gerotor motor.

18. The hydraulic axle combination of claim 1, wherein said input shaft gear is perpendicular to said intermeshing input gears and together therewith forms a T-shaped gear box, with said gear box being physically located intermediate said first and second pumps.

19. The hydraulic axle combination of claim 1, further including at least one breather cap in a top side of said housing.

20. The hydraulic axle combination of claim 1, further including, on a top side of said housing, a plurality of spaced attachment bosses, for attaching said axle combination to a chassis member of a powered, wheeled, drive unit.

21. The hydraulic axle combination of claim 20, wherein said chassis member includes a plurality of apertures, corresponding in location to said plurality of attachment bosses, and a plurality of fastening members for uniting said hydraulic axle combination with said chassis member.

22. A hydraulic transaxle assembly comprising in combination:
   a central housing having opposed, spaced, axially aligned, first and second pump chambers;
   a first hydrostatic pump, having a first pump shaft, operatively mounted in said first pump chamber;
   a first hydraulic motor axially aligned with and in operative as well as structural interconnection with said first hydrostatic pump, said first hydraulic motor including a first rotatable, coaxial, output shaft serving as a first axle shaft;
   a first manifold block structurally and operatively interposed between said first hydrostatic pump and said first hydraulic motor and together therewith enabling a first closed-loop drive system and forming a first, independent, hydrostatic transmission;
   a second hydrostatic pump, having a second pump shaft, operatively mounted in said second pump chamber;
   a second hydraulic motor axially aligned with and in operative as well as structural interconnection with said second hydrostatic pump, said second hydraulic motor including a second rotatable, coaxial, output shaft serving as a second axle shaft;
   a second manifold block structurally and operatively interposed between said second hydrostatic pump and said second hydraulic motor and together therewith enabling a second closed-loop drive system and forming a second, independent, hydrostatic transmission; and
   an input shaft, mounted in and extending into said housing between said first and second hydrostatic pumps, including a gear mounted on an intermediate portion thereof supplying torque to and perpendicularly intermeshing with said first and second input gears mounted on respective ones of said first and second pump shafts and forming therewith a T-shaped gear box, said gear box, together with said first and second, independent hydrostatic transmissions comprising said hydraulic transaxle assembly.

23. The hydraulic transaxle assembly of claim 22, wherein said first and second, independent transmissions are substantially similar, coaxial, mirror-image versions of each other.

24. The hydraulic transaxle assembly of claim 22, wherein said central housing includes an integral, internal sump, said sump serving as a single, integral, combination fluid reservoir for at least said first and second hydrostatic transmissions.

25. The hydraulic transaxle assembly of claim 24, further including at least one drain port and plug in said integral sump in a bottom side of said housing.

26. The hydraulic transaxle assembly of claim 24, further including at least one breather cap in a top side of said housing.

27. The hydraulic transaxle assembly of claim 24, further including a fluid filter assembly operatively interconnected with said sump at a rear side of said housing.

28. The hydraulic transaxle assembly of claim 22, further including a charge pump, mounted on a distal end of said input shaft, operatively interconnected with at least one of said first and second hydrostatic pumps.

29. The hydraulic transaxle assembly of claim 28, wherein said charge pump is mounted on the outside of a bottom surface of said housing.

30. The hydraulic transaxle assembly of claim 22, wherein a top side of said housing includes a cover, with said input shaft extending into said housing through an aperture in said cover.

31. The hydraulic transaxle assembly of claim 22, wherein each of said first and second hydraulic motors takes the form of an externally generated gerotor type orbital motor.

32. The hydraulic transaxle assembly of claim 22, further including at least one breather cap in a top side of said housing.

33. The hydraulic transaxle assembly of claim 22, further including, on a top side of said housing, a plurality of spaced attachment bosses, for attaching said transaxle assembly to a frame of a vehicle.

34. The hydraulic transaxle assembly of claim 33, wherein said frame member includes a plurality of apertures, each corresponding in location with said plurality of attachment bosses, and a further corresponding plurality of fastening members for structurally uniting said transaxle assembly with said frame.

* * * * *